United States Patent
Dassel

(10) Patent No.: US 9,718,694 B2
(45) Date of Patent: Aug. 1, 2017

(54) SYSTEM AND PROCESS FOR SILANE PRODUCTION

(71) Applicant: SITEC GMBH, Ausburg (DE)

(72) Inventor: Mark William Dassel, Poulsbo, WA (US)

(73) Assignee: SiTec GmbH, Augsburg (DE)

( * ) Notice: Subject to any disclaimer, the term of this patent is extended or adjusted under 35 U.S.C. 154(b) by 0 days.

(21) Appl. No.: 14/888,661

(22) PCT Filed: May 3, 2014

(86) PCT No.: PCT/US2014/036711
§ 371 (c)(1),
(2) Date: Nov. 2, 2015

(87) PCT Pub. No.: WO2014/182578
PCT Pub. Date: Nov. 13, 2014

(65) Prior Publication Data
US 2016/0090307 A1    Mar. 31, 2016

Related U.S. Application Data

(60) Provisional application No. 61/819,572, filed on May 4, 2013.

(51) Int. Cl.
| | |
|---|---|
| C01B 33/04 | (2006.01) |
| B01D 3/14 | (2006.01) |
| B01J 19/24 | (2006.01) |
| C01B 33/029 | (2006.01) |
| C01B 33/107 | (2006.01) |

(52) U.S. Cl.
CPC ............ *C01B 33/043* (2013.01); *B01D 3/143* (2013.01); *B01J 19/24* (2013.01); *C01B 33/029* (2013.01); *C01B 33/107* (2013.01); *B01J 2219/24* (2013.01)

(58) Field of Classification Search
CPC ...................................................... C01B 33/04
USPC ........................................................ 423/347
See application file for complete search history.

(56) References Cited

U.S. PATENT DOCUMENTS

| | | |
|---|---|---|
| 4,340,574 A | 7/1982 | Coleman |
| 9,089,788 B2 * | 7/2015 | Paetzold ............... B01D 3/143 |
| 2008/0095691 A1 | 4/2008 | Sonnenschein et al. |
| 2010/0150809 A1 | 6/2010 | Bill, Jr. |
| 2012/0183465 A1 | 7/2012 | Petrik |

FOREIGN PATENT DOCUMENTS

WO    2012087795    6/2012

OTHER PUBLICATIONS

European Extended Search Report, supplementary European Search report and European search opinion, dated Oct. 31, 2016.
Yaws C L et al., "New technologies for solar energy silicon: Cost analysis of UCC Silane Process", Solar Energy, Pergamon Press, Oxford GB, v. 22, No. 6, pp. 547-553, Jan. 1, 1979.

* cited by examiner

*Primary Examiner* — Edward Johnson
(74) *Attorney, Agent, or Firm* — BioMed IP

(57) ABSTRACT

By incorporating an additional TCS and/or DCS redistribution reactor in the TCS recycle loop and/or DCS recycle loop, respectively, of a process and system for silane manufacture, efficiencies in the production of silane are realized.

12 Claims, 4 Drawing Sheets

SYSTEM AND PROCESS FOR SILANE PRODUCTION

CROSS-REFERENCE TO RELATED APPLICATION

This application claims the benefit under 35 U.S.C. §119(e) of U.S. Provisional Patent Application No. 61/819,572 filed May 4, 2013, which application is incorporated herein by reference in its entirety.

FIELD OF THE INVENTION

The present invention relates generally to chemical manufacture, more specifically to systems and processes for the production of silane ($SiH_4$).

BACKGROUND

Monosilane, which may be referred to herein simply as silane, and which has the chemical formula $SiH_4$, is used worldwide for a variety of industrial and commercial purposes including the production of flat-screen television screens, semiconductor chips, and polysilicon for conversion to solar cells. Due to its high purity, monosilane is emerging as the preferred intermediate for polysilicon production, where it competes with purified trichlorosilane which remains the dominant feedstock of choice due to lower overall polysilicon production costs. Further market inroads are contingent on reducing monosilane production costs—while maintaining its quality advantage, and on lowering conversion cost to polysilicon.

Most of the world's monosilane is produced using the so-called Union Carbide Process ("UCC process"), patented by the Union Carbide Corporation in 1977. In the UCC process, liquid chlorosilanes from a hydrochlorination unit are used by a monosilane production unit to make pure silane gas ($SiH_4$). This is achieved through a sequence of distillation and catalytic redistribution reactions converting TCS into ultra-pure $SiH_4$ and co-product STC. The co-product STC is returned to the hydrochlorination unit to be converted back to TCS.

The UCC process includes two redistribution reactors, which are used to convert TCS to $SiH_4$. The reactor catalyst consists of dimethlyamino groups chemically grafted to a styrene based support. The support is a marcroreticular styrene-divinylbenzene copolymer. The redistribution of TCS to $SiH_4$ occurs through the progression of three reversible equilibrium reactions as shown:

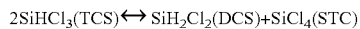

$$2SiHCl_3(TCS) \leftrightarrow SiH_2Cl_2(DCS) + SiCl_4(STC) \qquad 1.$$

$$2SiH_2Cl_2(DCS) \leftrightarrow SiHCl_3(TCS) + SiH_3Cl(MCS) \qquad 2.$$

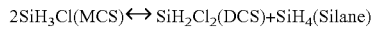

$$2SiH_3Cl(MCS) \leftrightarrow SiH_2Cl_2(DCS) + SiH_4(Silane) \qquad 3.$$

While it is convenient to consider the transformation from TCS to $SiH_4$ as a series of these three separate reactions, in reality, all occur simultaneously in each reactor until equilibrium is achieved. Assuming that the reaction time is long enough to satisfy the reaction kinetics and equilibrium is achieved, the product composition within each reactor is determined mainly by the composition of the feed and secondarily by reaction temperature.

The redistribution reactor performing the first reaction is called the TCS reactor because it is designed to receive a pure TCS feedstock. With a pure TCS feedstock, the equilibrium of the three reactions is such that only reaction #1 progresses measurably in this reactor. The extent of reaction under these conditions is about 20%, with the reactor product being 80% of the unreacted TCS feed and 20% products: i.e., 10% DCS and 10% STC. Due to the low first pass conversion of TCS to DCS in this TCS reactor, distillation columns are used to separate the products, recovering the more hydrogenated chlorosilanes for recycle back the TCS reactor.

A first distillation column is used to both separate the STC from the TCS in the fresh chlorosilane feed stream and separate the STC in the product from the TCS reactor. A second distillation column is used to separate the DCS from TCS in the overhead product from the first distillation column. The bottom product from this second distillation column is essentially pure TCS and becomes the feed stock to the TCS redistribution reactor.

The DCS rich, TCS lean, product exiting the top of the second distillation column becomes the feed stock to the second redistribution reactor, called the DCS redistribution reactor ("DCS Reactor"). Due to the high DCS content in this feedstock, the equilibrium of the three reactions is such that only reactions #2 and #3 progress measurably in this reactor. The extent of reactions under these conditions is such that $SiH_4$, MCS, DCS and TCS are all present in the reactor product. $SiH_4$ composition in the DCS Reactor product is only 12-15 mole percent at equilibrium, and thus a third higher pressure column is used to separate and purify the $SiH_4$ from the MCS, DCS and TCS present in the DCS Reactor product. The MCS, DCS and TCS are then recycled back as a second feed to the second distillation column where the MCS and DCS are top products and feed the DCS Reactor. The TCS travels to the bottom of the second distillation column with the other TCS present in the feed stream from the first distillation column, thus increasing the amount of TCS in feed to the TCS Reactor.

In summary, a large TCS recycle loop with mass flow rate 100 times greater than that of the $SiH_4$ product mass flow rate must pass through the TCS Reactor to convert TCS in the fresh feedstock and TCS made as a by-product of $SiH_4$ production in the DCS Reactor to DCS. Once DCS is formed and separated from recycle TCS it becomes the feed to the DCS Reactor. A smaller DCS/MCS recycle loop whose mass flow rate is 20 times that of the $SiH_4$ product mass flow rate must flow through the DCS Reactor to convert DCS from the second distillation column and recycled DCS and MCS from the third distillation column into $SiH_4$.

To summarize, in the UCC process there are a total of two redistribution reactors. The first, which may be named the TCS Reactor, is located on the bottoms stream from the second distillation column. This stream is comprised almost entirely of TCS and contains de minimis amounts of DCS and STC, and is part of the TCS recycle loop. The second redistribution reactor, which may be named the DCS Reactor, is located on the overhead stream leaving the top of the second distillation column. This stream is substantially comprised of MCS and DCS, and is part of the DCS recycle loop. In normal operation, approximately 20% of TCS entering the TCS Reactor is converted to DCS and STC in roughly equal amounts, and approximately 45% to 50% of the DCS entering the DCS Reactor is converted to silane and TCS in roughly a 1:2 molar ratio.

Impurities in the crude feed stream, which comprise boron and phosphorus, are either absorbed by the redistribution catalyst, captured in filter elements, or leave with the co-product STC. The $SiH_4$ product is of exceptionally high purity with boron and phosphorus levels at the 5-10 pptw level.

Despite the commercial success of the UCC process, it is expensive to build, maintain and operate in large part due to the large mass flow rate through the TCS recycle loop, and to a lesser extent due to the large mass flow rate through the DCS recycle loop. The present disclosure provides improvements on the UCC process and related advantages as described herein.

SUMMARY

In one aspect, and as illustrated in FIG. 1, the present disclosure provides a system for silane production comprising:
a. a first distillation column in fluid communication with
   i. a first TCS redistribution reactor; and
   ii. a second TCS redistribution reactor;
b. a second distillation column in fluid communication with
   i. the first TCS redistribution reactor;
   ii. the second TCS redistribution reactor;
   iii. a first DCS redistribution reactor; and
   iv. a second DCS redistribution reactor;
c. and a third distillation column in fluid communication with
   i. the first DCS redistribution reactor; and
   ii. the second DCS redistribution reactor.

In a related aspect, the present disclosure provides a process which may performed with the system illustrated in FIG. 1, where the process comprises:
a. introducing a stream 1 into a first distillation column, where stream 1 comprises DCS, TCS and STC;
b. recovering a stream 2 and a stream 3 from the first distillation column, where stream 2 comprises STC and stream 3 comprises DCS and TCS;
c. introducing the stream 3 into a second TCS redistribution reactor;
d. recovering a stream 4 from the second TCS redistribution reactor, where stream 4 comprises DCS, TCS and STC;
e. introducing the stream 4 and a stream 11 into a second distillation column, where stream 11 comprises silane, MCS, DCS and TCS;
f. recovering a stream 5 and a stream 7 from the second distillation column, where stream 5 comprises TCS and STC and stream 7 comprises silane, MCS and DCS;
g. introducing the stream 7 to a first DCS redistribution reactor;
h. recovering a stream 8 from the first DCS redistribution reactor, where stream 8 comprises silane, MCS, DCS and TCS;
i. introducing the stream 8 into a third distillation column;
j. recovering a stream 9 and a stream 10 from the third distillation column, where stream 9 comprises MCS, DCS and TCS and stream 10 comprises silane;
k. introducing the stream 9 into a second DCS redistribution reactor;
l. recovering the stream 11 from the second DCS redistribution reactor;
m. introducing the stream 5 into a first TCS redistribution reactor;
n. recovering a stream 6 from the first TCS redistribution reactor, where stream 6 comprises DCS, TCS and STC; and
o. introducing stream 6 into the first distillation column.

In another aspect, and as illustrated in FIG. 2, the present disclosure provides a system for silane production, the system comprising:
a. a first distillation column in fluid communication with
   i. a first TCS redistribution reactor and
   ii. a second TCS redistribution reactor;
b. a second distillation column in fluid communication with
   i. the first TCS redistribution reactor;
   ii. the second TCS redistribution reactor;
   iii. a third distillation column; and
   iv. a first DCS redistribution reactor;
c. and the third distillation column in fluid communication with
   i. the first DCS redistribution reactor; and
   ii. the second distillation column.

In a related aspect, the present disclosure provides a process which may performed with the system illustrated in FIG. 2, where the process comprises:
a. introducing a stream 1 into a first distillation column, where stream 1 comprises DCS, TCS and STC;
b. recovering a stream 2 and a stream 3 from the first distillation column, where stream 2 comprises STC and stream 3 comprises DCS and TCS;
c. introducing the stream 3 into a second TCS redistribution reactor;
d. recovering a stream 4 from the second TCS redistribution reactor, where stream 4 comprises DCS, TCS and STC;
e. introducing the stream 4 and a stream 9 into a second distillation column, where stream 9 comprises MCS, DCS and ICS;
f. recovering a stream 5 and a stream 7 from the second distillation column, where stream 5 comprises TCS and STC and stream 7 comprises silane, MCS and DCS;
g. introducing the stream 7 to a first DCS redistribution reactor;
h. recovering a stream 8 from the first DCS redistribution reactor, where stream 8 comprises silane, MCS, DCS and ICS;
i. introducing the stream 8 into a third distillation column;
j. recovering a stream 9 and a stream 10 from the third distillation column, where stream 9 comprises MCS, DCS and TCS and stream 10 comprises silane;
k. introducing the stream 9 into the second distillation column;
l. introducing the stream 5 into a first TCS redistribution reactor;
m. recovering a stream 6 from the first TCS redistribution reactor, where stream 6 comprises DCS, TCS and STC; and
n. introducing stream 6 into the first distillation column.

In another aspect, and as illustrated in FIG. 3, the present disclosure provides a system for silane production, the system comprising:
a. a first distillation column in fluid communication with
   i. a first TCS redistribution reactor; and
   ii. a second distillation column;
b. the second distillation column in fluid communication with
   i. the first TCS redistribution reactor;
   ii. the first distillation column;
   iii. a first DCS redistribution reactor; and
   iv. a second DCS redistribution reactor;
c. and a third distillation column in fluid communication with
   i. the first DCS redistribution reactor; and
   ii. the second DCS redistribution reactor.

In a related aspect, the present disclosure provides a process which may performed with the system illustrated in FIG. 3, where the process comprises:
a. introducing a stream 1 into a first distillation column, where stream 1 comprises DCS, TCS and STC;

b. recovering a stream 2 and a stream 3 from the first distillation column, where stream 2 comprises STC and stream 3 comprises DCS and ICS;
c. introducing the stream 3 and a stream 11 into a second distillation column, where stream 11 comprises silane, MCS, DCS and ICS;
d. recovering a stream 5 and a stream 7 from the second distillation column, where stream 5 comprises TCS and STC and stream 7 comprises silane, MCS and DCS;
e. introducing the stream 7 to a first DCS redistribution reactor;
f. recovering a stream 8 from the first DCS redistribution reactor, where stream 8 comprises silane, MCS, DCS and ICS;
g. introducing the stream 8 into a third distillation column;
h. recovering a stream 9 and a stream 10 from the third distillation column, where stream 9 comprises MCS, DCS and TCS and stream 10 comprises silane;
i. introducing the stream 9 into a second DCS redistribution reactor;
j. recovering the stream 11 from the second DCS redistribution reactor
k. introducing stream 5 into a first TCS redistribution reactor;
l. recovering a stream 6 from the first TCS redistribution reactor, where stream 6 comprises DCS, TCS and STC; and
m. introducing stream 6 into the first distillation column.

In one embodiment, the systems as disclosed herein and the processes as disclosed herein may be performed in combination with polysilicon manufacture. For example, the systems as disclosed herein may include a reactor, e.g., a CVD reactor, for polysilicon production by, e.g., the UCC process, the Siemens process or a modified Siemens process. The processes as disclosed herein may include the production of polysilicon from silane by, e.g., the UCC process, or from trichlorosilane, e.g., by the Siemens process.

The details of one or more embodiments are set forth in the description below. The features illustrated or described in connection with one exemplary embodiment may be combined with the features of other embodiments. Other features, objects and advantages will be apparent from the description, the drawings, and the claims. In addition, the disclosures of all patents and patent applications referenced herein are incorporated by reference in their entirety.

BRIEF DESCRIPTION OF THE DRAWINGS

Features of the present disclosure, its nature and various advantages will be apparent from the accompanying drawings and the following detailed description of various embodiments.

Figure 1:
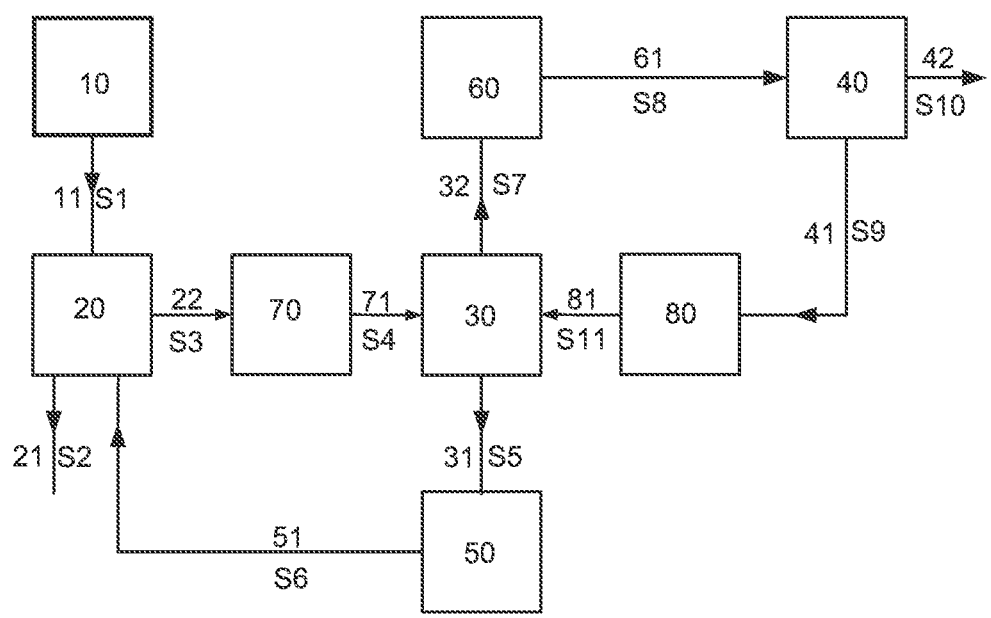
FIG. 1 is a schematic block diagram of a system and process of the present disclosure for the production of silane comprising three distillation columns, two redistribution reactors on the TCS recycle loop and two redistribution reactors on the DCS recycle loop.

Corresponding reference numerals indicate corresponding parts throughout the drawings. The detailed description of the present disclosure makes reference to various chemical streams that are generated and consumed. These streams are identified as stream 1, stream 2, etc. For the convenience of the reader, in the Figures, the reference S1 is placed next to the conduit that carries stream 1, the reference S2 is placed next to the conduit that carries stream 2, etc. The reference numbers used in the drawings and the name used herein for the corresponding part are provided in Table 1.

TABLE 1

| Ref. No. | Part Name |
| --- | --- |
| S1 | Stream 1 |
| 10 | Source for Stream 1 |
| 11 | Conduit for Stream 1 |
| 20 | First Distillation Column |
| S2 | Stream 2 |
| 21 | Conduit for Stream 2 |
| S3 | Stream 3 |
| 22 | Conduit for Stream 3 |
| 23 | Mixing Valve |
| 30 | Second Distillation Column |
| S5 | Stream 5 |
| 31 | Conduit for Stream 5 |
| S7 | Stream 7 |
| 32 | Conduit for Stream 7 |
| 40 | Third Distillation Column |
| S9 | Stream 9 |
| 41 | Conduit for Stream 9 |
| S10 | Stream 10 |
| 42 | Conduit for Stream 10 |
| 50 | First TCS Redistribution Reactor |
| S6 | Stream 6 |
| 51 | Conduit for Stream 6 |
| 60 | First DCS Redistribution Reactor |
| S8 | Stream 8 |
| 61 | Conduit for Stream 8 |
| 70 | Second TCS Redistribution Reactor |
| S4 | Stream 4 |
| 71 | Conduit for Stream 4 |
| 80 | Second DCS Redistribution Reactor |
| S11 | Stream 11 |
| 81 | Conduit for Stream 11 |
| 85, 86 | Conduits |
| 87 | Mixing Valve |
| 88 | Conduit |
| 89 | Quenching Chamber |
| 90, 91, 92 | Conduits |
| 93 | Hydrogenation Reactor |
| 94, 95, 96, | Conduits |
| 97 | Column |
| 98, 99 | Conduits |
| 100 | Storage Tank |

DETAILED DESCRIPTION OF THE INVENTION

The present disclosure provides systems and processes for silane production. As used herein, STC will be used to designate silicon tetrachloride ($SiCl_4$); TCS will designate trichlorosilane ($HSiCl_3$); DCS will designate dichlorosilane ($H_2SiCl_2$); MCS will designate monochlorosilane ($H_3SiCl$) and silane will designate $SiH_4$. In brief, the system of the present disclosure comprises first, second and third distillation columns which are identified in the FIGS. 1-3 as 20, 30 and 40, respectively. In addition, the system comprises at least one TCS redistribution reactor, designated as 50 in FIGS. 1-3, and at least one DCS redistribution reactor, designated as 60 in FIGS. 1-3. For convenience, the TCS redistribution reactor (TCS-RR) 50 will be referred to as the first TCS-RR 50, and the DCS redistribution reactor (DCS-RR) 60 will be referred to as the first DCS-RR 60. In addition, the system comprises one or both of a second TCS-RR 70 and a second DCS-RR 80. Optionally, the system may comprise a reactor for polysilicon production.

An embodiment of the process and system of the present disclosure is illustrated in FIG. 1. In FIG. 1, the first distillation column 20 receives stream 1 via conduit 11 from a source 10, the stream 1 comprising DCS, TCS and STC. The source 10 will be discussed later herein, but may be, for example, an off-gas of a hydrogenation reactor that produces unrefined TCS. First distillation column 20 forms and provides relatively high boiling stream 2 which comprises STC, and relatively low boiling stream 3 which comprises DCS and TCS. Stream 2 exits column 20 via conduit 21, while stream 3 exits column 20 via conduit 22. The STC in stream 2 may be recycled to a hydrogenation reactor in the front end of the plant, as discussed later herein.

The embodiment of FIG. 1 also comprises a second distillation column 30. The column 30 receives two streams, identified in FIG. 1 as stream 4 and stream 11. Stream 4 comprises DCS, TCS and STC, and enters distillation column 30 via conduit 71, while stream 11 comprises silane, MCS, DCS and TCS, and enters column 30 via conduit 81. In addition, second distillation column 30 generates two streams, identified in FIG. 1 as stream 5 and stream 7. Stream 5 comprises relatively high boiling TCS and STC, and exits column 30 via conduit 31. Stream 7 comprises relatively low boiling silane, MCS and DCS, and exits column 30 via conduit 32.

In addition, the embodiment of FIG. 1 comprises a third distillation column 40. The column 40 receives a stream 8 via conduit 61, where stream 8 comprises silane, MCS, DCS and TCS. Column 40 generates two streams, namely stream 9 and stream 10. Stream 9 comprises relatively high boiling MCS, DCS and TCS, while stream 10 comprises relatively low boiling but highly pure silane. Stream 9 exits column 40 via conduit 41, while stream 10 exits column 40 via conduit 42.

In addition to the three distillation columns 20, 30 and 40, the embodiment of FIG. 1 comprises four redistribution reactors 50, 60, 70 and 80. The units 20, 30, 50 and 70 and/or streams S3, S4, S5 and S6 in FIG. 1 comprise what will be referred to as the TCS recycle loop. The units 30, 40, 60 and 80 and/or streams S7, S8, S9 and S11 comprise what will be referred to as the DCS recycle loop.

As used herein, a redistribution reactor receives one or more feedstock streams and converts that feedstock(s) into an effluent stream according to the following three equilibrium reactions.

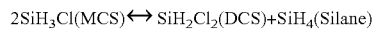

For example, a single composition may be directed into the redistribution reactor, where this single composition contains both dichlorosilane and silicon tetrachloride. The redistribution reactor is operated under redistribution conditions, so that a redistribution reaction occurs between the dichlorosilane and the silicon tetrachloride, and trichlorosilane is thereby produced. A catalyst may be present in the redistribution reactor, e.g., a combination of tertiary amine and tertiary amine salt as disclosed in, e.g., U.S. Pat. No. 4,610,858. As disclosed in U.S. Pat. No. 4,610,858, the combination of tertiary amine and tertiary amine salt is used to perform a disproportionation reaction, which is an equilibrium reaction whereby TCS may be converted to silane ($SiH_4$) and STC. The redistribution reaction of the present disclosure may utilize the same catalyst and operating conditions of temperature and pressure as disclosed in U.S. Pat. No. 4,610,858. A fixed bed or fluid bed reactor may be employed in the redistribution reactor.

The TCS recycle loop comprises two redistribution reactors that receive TCS, and these will be referred to as the first TCS-RR 50 and the second TCS-RR 70. In the TCS recycle loop, stream 3 comprising DCS and TCS from the distillation column 20 is introduced into the second TCS-RR 70. TCS-RR 70 converts a portion of the TCS in stream 3 into DCS and STC, thereby generating stream 4 which comprises DCS, TCS, and STC, where the DCS and STC content in stream 4 are greater than that introduced into TCS-RR 70 via steam 3 and the TCS content is lower than that introduced into TCS-RR 70 via steam 3. Stream 4 exits TCS-RR 70 via conduit 71. Stream 4 is then introduced into distillation column 30 as discussed previously, and stream 5 exits distillation column 30 via conduit 31. The contents of stream 5 enter the first TCS-RR 50. In TCS-RR 50, the TCS and STC of stream 5 undergo an equilibrium reaction so as to generate stream 6 which comprises DCS in addition to the TCS and STC that were present in stream 5. Stream 6 is introduced into distillation column 20, where stream 6 is separated into relatively high boiling stream 2 comprising STC and relatively low boiling stream 3 comprising DCS and TCS.

Optionally, the feedstock to the first TCS-RR may be characterized in terms of the relative amounts of chloride and silicon present in the feedstock. In various embodiments, the feedstock to the first TCS-RR has a ratio of chloride to silicon atoms in the range of 4:1 to 1:1, or in the range of 3.5:1 to 2:1, or in the range of 3.5:1 to 2.5:1. Likewise, the feedstock to the second TCS-RR may be characterized by the same ratio. In various embodiments, the feedstock to the second TCS-RR has a ratio of chloride to silicon atoms in the range of 4:1 to 1:1, or in the range of 3.5:1 to 2:1, or in the range of 3.5:1 to 2.5:1. Optionally, the ratio of chloride to silicon atoms in the feedstock to the first TCS-RR is greater than the ratio of chloride to silicon atoms in the feedstock to the second TCS-RR. For example, the ratio of chloride to silicon atoms in the feedstock to the first TCS-RR may be in the range of 4:1 to 2.7:1 while the ratio of chloride to silicon atoms in the feedstock to the second TCS-RR is a lower value that may be in the range of 3.5:1 to 2.5:1.

The DCS recycle loop likewise comprises two redistribution reactors that receive DCS, and these will be referred to as the first DCS-RR 60 and the second DCS-RR 80. In the DCS recycle loop, stream 7 comprising silane, MCS and DCS from the distillation column 20 is introduced via conduit 32 to the first DCS-RR 60. DCS-RR 60 converts a portion of the DCS in stream 7 into silane and TCS, thereby generating stream 8 which comprises silane, MCS, DCS, and TCS, where the silane and TCS content in stream 8 are greater than that introduced into DCS-RR 60 via steam 7 and the DCS content is lower than that introduced into DCS-RR 60 via steam 7. Stream 8 exits DCS-RR 60 via conduit 61. Stream 8 is introduced into the third distillation column 40 to generate a stream 9 comprising MCS, DCS and TCS, and a stream 10 comprising largely pure silane. The stream 9 is directed via conduit 41 to a second DCS-RR 80, which converts the mixture of MCS, DCS and TCS in stream 9 to a mixture of silane, MCS, DCS and TCS which exits second DCS-RR 80 via conduit 81 as stream 11. Stream 11 is introduced into the second distillation column 30 as discussed above, to generate streams 5 and 7.

Optionally, the feedstock to the first DCS-RR may be characterized in terms of the relative amounts of chloride and silicon present in the feedstock. In various embodiments, the feedstock to the first DCS-RR has a ratio of chloride to silicon atoms in the range of 4:1 to 1:1, or in the range of 3:1 to 1:1, or in the range of 2.5:1 to 1:1. Likewise, the feedstock to the second DCS-RR may be characterized by the same ratio. In various embodiments, the feedstock to the second DCS-RR has a ratio of chloride to silicon atoms in the range of 4:1 to 1:1, or in the range of 3.5:1 to 1:1. Optionally, the ratio of chloride to silicon atoms in the feedstock to the second DCS-RR is greater than the ratio of chloride to silicon atoms in the feedstock to the first DCS-RR. For example, the ratio of chloride to silicon atoms in the feedstock to the first DCS-RR may be in the range of 2:1 to 1:1 while the ratio of chloride to silicon atoms in the feedstock to the second DCS-RR is a higher value that may be in the range of 3:1 to 1.5:1.

In the system shown in FIG. 1, any one or more of the redistribution reactors 50, 60, 70 and 80 may incorporate a reactor filter, where the reactor filter will catch fine particles of, for example, 5 microns or smaller from becoming entrapped in the reactor. The ion exchange resin used in a redistribution reactor functions as a deep bed filtration device trapping fine particles that enter or are formed in the redistribution reactor. These particles may be, e.g., silicates, boron-silicates, metal chlorides and small bits of ion exchange resin. Over time these particles build up causing high pressure drop across the reactor. One option to address this problem is to periodically reverse the flow through the reactor (a flow that is originally bottom up is changed to top down) in order to flush out these fine particles. However, during this backflow operation the fine particles are released downstream leading to potential contamination problems. One option for reducing the problem of fine particles is to install feed or outlet filters on the reactors, preferably outlet filters, which will catch these fine particles. This approach will substantially reduce the contamination risk associated with periodically backflushing the reactor. The reactor filter must periodically be replaced or cleaned, or else it will become plugged and cause increased pressure within the reactor. Likewise, the systems illustrated in any of FIG. 2, FIG. 3 and FIG. 4 may incorporate redistribution reactors that include a reactor filter.

Figure 2:
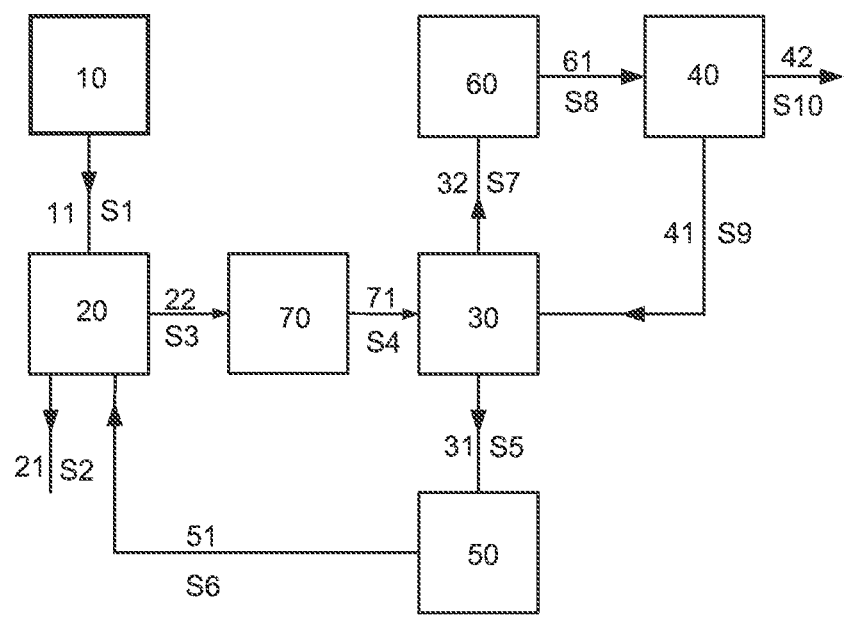
FIG. 2 is a schematic block diagram of a system and process of the present disclosure for the production of silane comprising three distillation columns, two redistribution reactors on the TCS recycle loop and one redistribution reactor on the DCS recycle loop.
Figure 3:
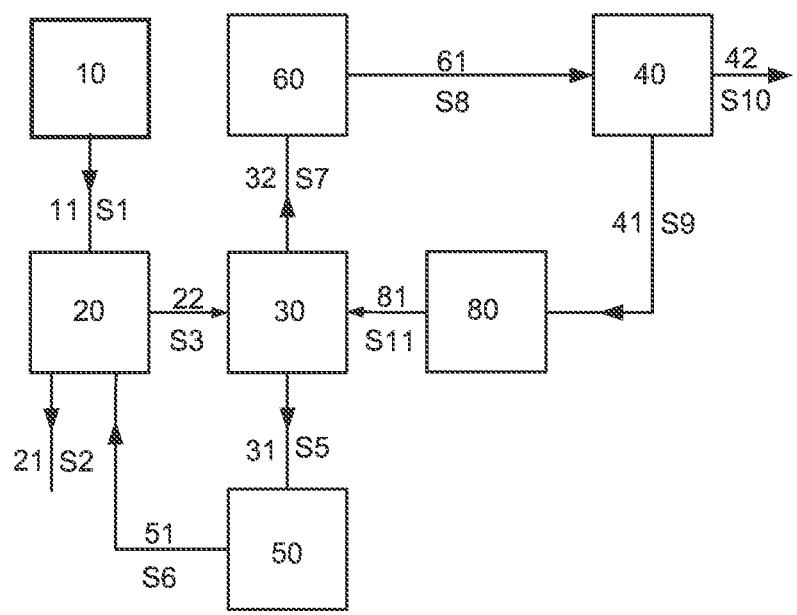
FIG. 3 is a schematic block diagram of a system and process of the present disclosure for the production of silane comprising three distillation columns, one redistribution reactor on the TCS recycle loop and two redistribution reactors on the DCS recycle loop.

The embodiment of the present disclosure shown in FIG. 1 provides for two TCS-RRs on the TCS recycle loop and two DCS-RRs on the DCS recycle loop. In alternative embodiments, the present disclosure provides a system and process having two TCS-RRs on the TCS recycle loop but only a single DCS-RR on the DCS recycle loop, as illustrated in FIG. 2, and a system and process having two DCS-RRs on the DCS recycle loop but only a single TCS-RR on the TCS recycle loop, as illustrated in FIG. 3. The embodiments illustrated in FIGS. 2 and 3 will now be described in more detail.

An embodiment of the process and system of the present disclosure is illustrated in FIG. 2. The process and system illustrated in FIG. 2 has three distillation columns, two redistribution reactors on the TCS recycle loop, but only a single redistribution reactor on the DCS recycle loop. In FIG. 2, the first distillation column 20 receives stream 1 via conduit 11 from a source 10, the stream 1 comprising DCS, TCS and STC. The source 10 will be discussed later herein, but may be, for example, an off gas from a hydrogenation reactor that produces unrefined TCS. First distillation column 20 forms and provides relatively high boiling stream 2 which comprises STC, and relatively low boiling stream 3 which comprises DCS and TCS. Stream 2 exits column 20 via conduit 21, while stream 3 exits column 20 via conduit 22. The STC in stream 2 may be recycled to a hydrogenation reactor in the front end of the plant, as discussed later herein.

The embodiment of FIG. 2 also comprises a second distillation column 30. The column 30 receives two streams, identified in FIG. 2 as stream 4 and stream 9. Stream 4 comprises DCS, TCS and STC, and enters distillation column 30 via conduit 71. Stream 9 comprises MCS, DCS and TCS, and enters column 30 via conduit 41. In addition, second distillation column 30 generates two streams, identified in FIG. 2 as stream 5 and stream 7. Stream 5 comprises relatively high boiling TCS and STC, and exits column 30 via conduit 31. Stream 7 comprises relatively low boiling silane, MCS and DCS, and exits column 30 via conduit 32.

The embodiment of FIG. 2 comprises a third distillation column 40. The column 40 receives a stream 8 via conduit 61, where stream 8 comprises silane, MCS, DCS and TCS. Column 40 generates two streams, namely stream 9 and stream 10. Stream 9 comprises relatively high boiling MCS, DCS and TCS, while stream 10 comprises relatively low boiling and highly pure silane. Stream 9 exits column 40 via conduit 41, while stream 10 exits column 40 via conduit 42.

In addition to the three distillation columns 20, 30 and 40, the embodiment of FIG. 2 comprises three redistribution reactors 50, 60 and 70. The units 20, 30, 50 and 70 and/or streams S3, S4, S5 and S6 in FIG. 2 comprise what will be referred to as the TCS recycle loop. The units 30, 40 and 60 and/or streams S7, S8 and S9 comprise what will be referred to as the DCS recycle loop.

As used herein, a redistribution reactor receives a feedstock stream and converts that feedstock into an effluent stream according to the following three equilibrium reactions.

$$2SiHCl_3(TCS) \leftrightarrow SiH_2Cl_2(DCS) + SiCl_4(STC)$$

$$2SiH_2Cl_2(DCS) \leftrightarrow SiHCl_3(TCS) + SiH_3Cl(MCS)$$

$$2SiH_3Cl(MCS) \leftrightarrow SiH_2Cl_2(DCS) + SiH_4(Silane)$$

In FIG. 2, the TCS recycle loop comprises two redistribution reactors that receive TCS, and these will be referred to as the first TCS-RR 50 and the second TCS-RR 70. In the TCS recycle loop, stream 3 comprising DCS and TCS from the distillation column 20 is introduced into the second TCS-RR 70. TCS-RR 70 converts a portion of the TCS in stream 3 into DCS and STC, thereby generating stream 4 which comprises DCS, TCS, and STC, where the DCS and STC content in stream 4 are greater than that introduced into TCS-RR 70 via stream 3 and the TCS content is lower than that introduced into TCS-RR 70 via stream 3. Stream 4 exits TCS-RR 70 via conduit 71. Stream 4 is then introduced into distillation column 30 as discussed previously, and stream 5 exits distillation column 30 via conduit 31. The contents of stream 5 enter the first TCS-RR 50. TCS-RR 50 converts a portion of the TCS in stream 5 into DCS and STC, thereby generating stream 6 which comprises DCS, TCS, and STC, where the DCS and STC content in stream 6 are greater than that introduced into TCS-RR 50 via stream 5 and the TCS content is lower than that introduced into TCS-RR 50 via steam 5. Stream 6 exits TCS-RR 70 via conduit 51. Stream 6 is introduced into distillation column 20, where stream 6 is separated into relatively high boiling stream 2 comprising STC and relatively low boiling stream 3 comprising DCS and TCS.

The DCS recycle loop of the embodiment illustrated in FIG. 2 contains a single redistribution reactor that receives DCS, where this DCS-RR will be referred to as the first DCS-RR 60. In the DCS recycle loop, stream 7 comprising silane, MCS and DCS from the distillation column 30 is introduced into the first DCS-RR 60 via conduit 32. DCS-RR 60 converts a portion of the DCS in stream 7 into silane and TCS, thereby generating stream 8 which comprises silane, MCS, DCS, and TCS, where the silane and TCS content in stream 8 are greater than that introduced into DCS-RR 60 via steam 7 and the DCS content is lower than that introduced into DCS-RR 60 via stream 7. Stream 8 exits DCS-RR 60 via conduit 61. Stream 8 is introduced into the third distillation column 40 to generate a stream 9 comprising MCS, DCS and TCS, and a stream 10 comprising largely pure silane. The stream 9 is directed via conduit 41 to the second distillation column 30 to generate streams 5 and 7. In contrast to the embodiment illustrated in FIG. 1, stream 9 does not enter a second DCS-RR, and in fact the embodiment of FIG. 2 contains only a single DCS-RR on the DCS recycle loop.

In the process and system of the present disclosure represented by FIG. 2, there are a total of three redistribution reactors. The first TCS-RR 50 is located on the bottoms stream 5 leaving the second distillation column 30 and the first DCS-RR 60 is located on the overhead stream 7 leaving the top of the second distillation column 30. The third reactor, named the second TCS-RR 70, is located on the feed to the second distillation column 30 from the first distillation column 20. Thus, in the process configuration of the present disclosure illustrated in FIG. 2, there is a redistribution reactor (1) on the overhead stream 3 exiting the column 20 via conduit 22 to the second distillation column 30, (2) on the bottoms stream 5 exiting the column 30 via conduit 31 to the first distillation column 20, and (3) on the overhead stream 7 exiting the column 30 via conduit 32 to the third distillation column 40. Compared to a comparable process lacking the second TCS-RR 70, the configuration of FIG. 2 increases TCS to DCS conversion per pass around the TCS recycle loop by about 37%, resulting in about 25% less TCS recycle around the TCS recycle loop (a.k.a., low pressure/medium pressure columns loop).

In the system and process illustrated in FIG. 2, the following optional embodiments may be included.

As an optional embodiment, the first distillation column 20 exit stream 2 may be cooled before being fed into the second TSC-RR 70. The requirement for cooling medium (e.g., cooling water) and adverse effect on second distillation column 30 reboiler duty is minimal because approximately 80% of the cooling load can be recovered with a process to process exchanger.

A variation of this modification is where the feed to the new reactor 70 is pressurized and the product exiting the new reactor 70 is flashed.

Another embodiment of the process and system of the present disclosure is illustrated in FIG. 3. The process and system illustrated in FIG. 3 has three distillation columns, two redistribution reactors on the DCS recycle loop, but only one redistribution reactor on the TCS recycle loop. In FIG. 3, the first distillation column 20 receives stream 1 via conduit 11 from a source 10, the stream 1 comprising DCS, TCS and STC. The source 10 will be discussed later herein, but may be, for example, an off gas from a hydrogenation reactor that produces unrefined TCS. First distillation column 20 forms and provides relatively high boiling stream 2 which comprises STC, and relatively low boiling stream 3 which comprises DCS and TCS. Stream 2 exits column 20 via conduit 21, while stream 3 exits column 20 via conduit 22. The STC in stream 2 may be recycled to a hydrogenation reactor in the front end of the plant, as discussed later herein.

The embodiment of FIG. 3 also comprises a second distillation column 30. The column 30 receives two streams, identified in FIG. 3 as stream 3 and stream 11. Stream 3 comprises DCS and TCS, and enters distillation column 30 via conduit 22. Stream 11 comprises silane, MCS, DCS and TCS, and enters column 30 via conduit 81. In addition, second distillation column 30 generates two streams, identified in FIG. 3 as stream 5 and stream 7. Stream 5 comprises relatively high boiling TCS and STC, and exits column 30 via conduit 31. Stream 7 comprises relatively low boiling silane, MCS and DCS, and exits column 30 via conduit 32.

The embodiment of FIG. 3 comprises a third distillation column 40. The column 40 receives a stream 8 via conduit 61, where stream 8 comprises silane, MCS, DCS and TCS. Column 40 generates two streams, namely stream 9 and stream 10. Stream 9 comprises relatively high boiling MCS, DCS and TCS, while stream 10 comprises relatively low boiling but highly pure silane. Stream 9 exits column 40 via conduit 41, while stream 10 exits column 40 via conduit 42.

In addition to the three distillation columns 20, 30 and 40, the embodiment of FIG. 3 comprises three redistribution reactors 50, 60 and 80. The units 20, 30 and 50 and/or the streams S3, S5 and S6 in FIG. 3 comprise what will be referred to as the TCS recycle loop. The units 30, 40, 60 and 80 and/or streams S7, S8, S9 and S11 comprise what will be referred to as the DCS recycle loop.

As used herein, a redistribution reactor receives a feedstock stream and converts that feedstock into an effluent stream according to the following three equilibrium reactions.

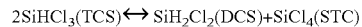

$$2\text{SiHCl}_3(\text{TCS}) \leftrightarrow \text{SiH}_2\text{Cl}_2(\text{DCS}) + \text{SiCl}_4(\text{STC})$$

$$2\text{SiH}_2\text{Cl}_2(\text{DCS}) \leftrightarrow \text{SiHCl}_3(\text{TCS}) + \text{SiH}_3\text{Cl}(\text{MCS})$$

$$2\text{SiH}_3\text{Cl}(\text{MCS}) \leftrightarrow \text{SiH}_2\text{Cl}_2(\text{DCS}) + \text{SiH}_4(\text{Silane})$$

The TCS recycle loop of the embodiment illustrated in FIG. 3 comprises a single redistribution reactor that receives TCS, and this will be referred to as the first TCS-RR 50. In the TCS recycle loop, stream 3 comprising DCS and TCS from the distillation column 20 is introduced to the second distillation column 30 without passing through a redistribution reactor. Streams 5 and 7 are generated by and exit distillation column 30 via conduits 31 and 32, respectively. The contents of stream 5 enter the first TCS-RR 50. TCS-RR 50 converts a portion of the TCS in stream 5 into DCS and STC, thereby generating stream 6 which comprises DCS, TCS, and STC, where the DCS and STC content in stream 6 are greater than that introduced into TCS-RR 50 via steam 5 and the TCS content is lower than that introduced into TCS-RR 50 via steam 5. Stream 6 exits TCS-RR 50 via conduit 51. Stream 6 is introduced to distillation column 20, where it is separated into relatively high boiling stream 2 comprising STC and relatively low boiling stream 3 comprising DCS and TCS.

In FIG. 3, the DCS recycle loop comprises two redistribution reactors that receive DCS, and these will be referred to as the first DCS-RR 60 and the second DCS-RR 80. In the DCS recycle loop, stream 7 comprising silane, MCS and DCS from the distillation column 30 is introduced via conduit 32 to the first DCS-RR 60. DCS-RR 60 converts a portion of the DCS in stream 7 into silane and TCS, thereby generating stream 8 which comprises silane, MCS, DCS, and TCS, where the silane and TCS content in stream 8 are greater than that introduced into DCS-RR 60 via steam 7 and the DCS content is lower than that introduced into DCS-RR 60 via stream 7. Stream 8 exits DCS-RR 60 via conduit 61. Stream 8 is introduced into the third distillation column 40 to generate a stream 9 comprising MCS, DCS and TCS, and a stream 10 comprising largely pure silane. The stream 9 is directed via conduit 41 to a second DCS-RR 80, which converts the mixture of MCS, DCS and TCS in stream 9 to a mixture of silane, MCS, DCS and TCS which exits the second DCS-RR 80 via conduit 81 as stream 11. Stream 11 is introduced into the second distillation column 30 as discussed above, to generate streams 5 and 7.

The present disclosure provides systems and processes that include at least three redistribution reactors in a system and process for silane manufacture, where at least two of those redistribution reactors operate in series in a recycle loop. The system and process of the present disclosure may be utilized in a plant that manufactures polysilicon from silane. Such a plant may be based on the well-known and widely-practiced UCC process, to which according to the present disclosure a second TCS-RR and/or a second DCS-RR is added to a TCS recycle loop and/or a DCS recycle loop, respectively, as explained herein.

In operation, the first, second and third distillation columns may operate at the same, or at different, pressures. The first distillation column should operate under conditions that provide for the separation of STC from DCS/TCS. The second distillation column should operate under conditions that provide for the separation of TCS/STC from silane/MCS/DCS. The third distillation column should operate under conditions that provide for the separation of silane from MCS/CDS/TCS. In each case, separation need not be complete separation, but should be at least partial separation. For example, the first distillation column 20 may operate at relatively low pressure, the second distillation column 30 may operate at a pressure greater than the operating pressure of the first distillation column 20, and the third distillation column 40 may operate at a pressure greater than the operating pressure of the second distillation column 30. To reflect this incremental increase in operating pressure between the first (20), second (30) and third (40) distillation columns, those three columns may alternatively be referred to as the low pressure, medium pressure and high pressure columns, respectively.

Figure 4:
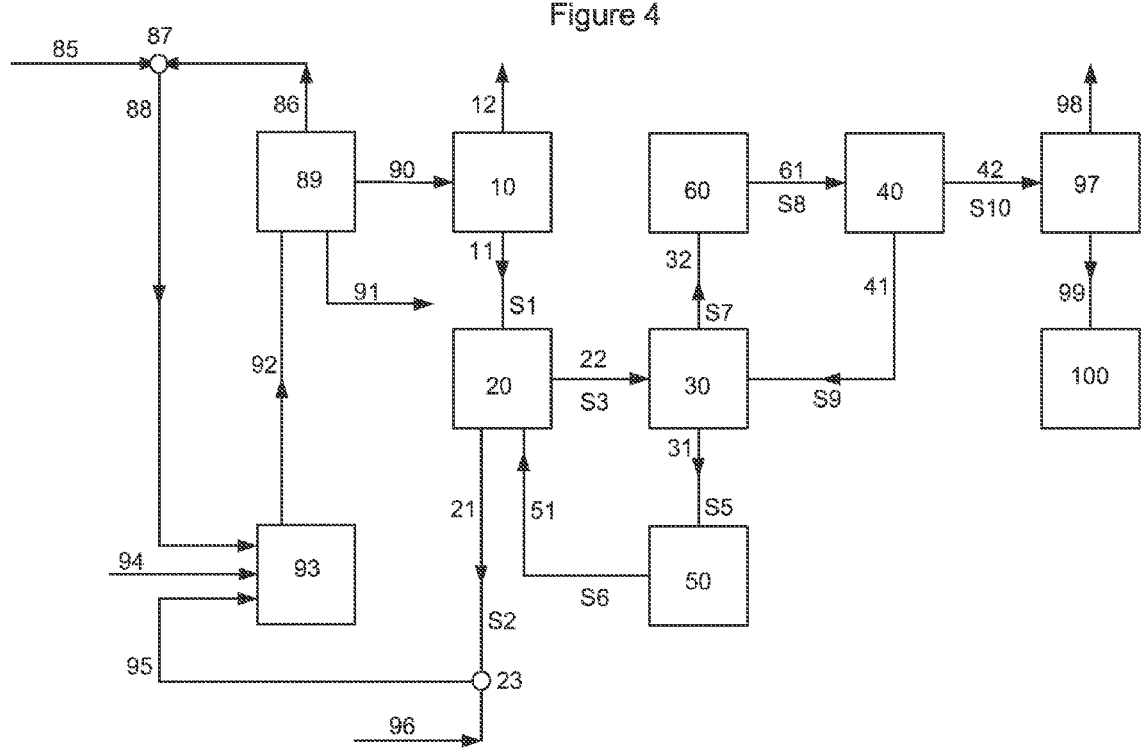
FIG. 4 is a schematic block diagram of a system and process for the production of silane that comprises one redistribution reactor on the TCS recycle loop and one redistribution reactor on the DCS recycle loop.

FIG. 4 is provided to illustrate two points. The first point is to provide a reference system and process for comparison with the system and process of the present disclosure. This point will be discussed later herein. The second point, to be discussed at this time, is to provide an exemplary system and process for providing stream 1 to the system and process of the present disclosure, and/or for utilizing stream 10 of the present system and process. The systems and processes of the present disclosure, which are illustrated in FIGS. 1-3, receive a stream 1 that contains a mixture of DCS, TCS and STC. Such a mixture may be produced by a polysilicon producing plant, part of such a plant being illustrated in FIG. 4.

In FIG. 4, a conduit 85 delivers off gas, or a fraction or refinement thereof, from a polysilicon producing reactor, for example, a chemical vapor deposition (CVD) reactor or a fluidized bed reactor (FBR). The conduit 85 meets a conduit 86 at a mixing value 87, to provide a chemical stream that travels from mixing valve 87 through conduit 88 to hydrogenation reactor 93. Also entering hydrogenation reactor 93 is a supply of metallurgic silicon, which travels through conduit 94. STC, which may come from distillation unit 20 through conduit 21, mixing valve 23 and then conduit 95, may also be delivered to the hydrogenation reactor 93. Also entering mixing valve 23 is a make-up STC stream traveling through conduit 96. The product produced by the hydrogenation reactor 93 exits the reactor through conduit 92 and then enters a quenching chamber 89. The quenching chamber 89 generates three streams: a stream comprising hydrogen which exits through conduit 86; a stream comprising hydrogen, DCS, TCS and STC which exits through conduit 90, and a stream comprising heavy boiling materials which is delivered to a waste treatment facility through conduit 91. The stream exiting through conduit 86 is combined with the stream in conduit 85 at the mixing valve 87 as discussed above. The stream in conduit 90 is introduced into a light ends stripper 10, which is an optional source of stream 1 in the systems and processes of the present disclosure. Conduit 12 delivers light boiling impurities, such as unwanted nitrogen, methane, and hydrogen, from light stripper 10 to a waste treatment facility.

In addition, FIG. 4 shows a column 97 which receives silane from third distillation unit 40 via conduit 42. Exiting column 97 is conduit 98 that delivers hydrogen to waste treatment, and conduit 99 which delivers silane to a storage tank 100.

FIG. 4 shows a reference TCS recycle loop comprising first distillation column 20, stream S3, second distillation column 30, stream S5, first TCS-RR 50 and stream S6. The TCS recycle loop illustrated in FIGS. 1 and 2, which includes a second TCS-RR 70, may be substituted for the TCS recycle loop of FIG. 4 to provide another embodiment of the present disclosure. FIG. 4 also shows a reference DCS recycle loop comprising second distillation column 30, stream S7, first DCS-RR 60, stream 8, third distillation column 40, and stream S9. In another embodiment of the present disclosure, the DCS recycle loop illustrated in FIGS. 1 and 3, which includes a second TCS-RR 70, may be substituted for the DCS recycle loop of FIG. 4. To provide yet another embodiment of the present disclosure, each of the TCS recycle loop illustrated in FIGS. 1 and 2 and the DCS recycle loop illustrated in FIGS. 1 and 3 may be substituted for the TCS recycle loop and DCS recycle loop, respectively, of FIG. 4.

Accordingly, in one embodiment, the front end of a system and process illustrated in FIG. 4 may be used to provide a source of stream 1. Such an optional front end system and process comprises a hydrogenation reactor (a.k.a. hydrochlorination reactor) 93 which converts metallurgic silicon, silicon tetrachloride (STC/SiCl$_4$) and hydrogen to TCS; a quench system 89 which separates hydrogen recycle and waste high boilers from crude TCS; and a distillation column 10 which separates light impurities from the crude TCS stream. The hydrogenation reactor 93 receives metallurgical grade silicon (MGSi), chlorosilanes including one or more of DCS, TCS and STC, and hydrogen. One source of STC for the hydrogenation reactor may be stream S2.

The incorporation of two redistribution reactors on either one or both of the TCS recycle loop and the DCS recycle loop provides significant benefits. These benefits will be illustrated in the following discussion and Tables by comparing the system and process of FIG. 2, which has two TCS-RRs on the TCS recycle loop and one DCS-RR on the DCS recycle loop, to a corresponding system shown in FIG.

4 which has a single TCS-RR on the TCS recycle loop and a single DCS-RR on the DCS recycle loop.

By including two TCS-RRs on the TCS recycle loop, there are beneficial changes to the compositions of the streams that make up the TCS recycle loop. The overall net positive effect of these changes is illustrated in Tables 2 and 3. Table 2 shows the changes in stream 5 leading into the first TCS-RR 50 and the changes in stream 6 leading out of the first TCS-RR 50, when second TCS-RR 70 both is and is not present, as is the case in FIG. 2 (TCS-RR 70 is present) and in FIG. 4 (TCS-RR 70 is not present):

TABLE 2

|  | FIG. 4 (WITHOUT TCS-RR 70) | | FIG. 2 (WITH TCS-RR 70) | |
| --- | --- | --- | --- | --- |
|  | Stream 5 Mole % | Stream 6 Mole % | Stream 5 Mole % | Stream 6 Mole % |
| $SiH_4$ | 0.00 | 0.03 | 0.00 | 0.01 |
| MCS | 0.00 | 0.46 | 0.00 | 0.25 |
| DCS | 0.69 | 10.03 | 0.93 | 7.44 |
| TCS | 98.27 | 77.25 | 90.07 | 76.23 |
| STC | 1.04 | 12.23 | 9.00 | 16.06 |

Table 2 illustrates the following points:

The STC concentration in the feedstock stream 5 increases from 1% to 9% due to the STC that is made in the second TCS-RR 70 and that ends up in the stream 5 to the first TCS-RR 50.

The TCS concentration in the feedstock stream 5 decreases from 98% to 90% due to the TCS in stream 3 that is converted to DCS in the second TCS-RR 70.

Because of the higher STC content and lower TCS content in stream 5 leading to first TCS-RR 50 in the configuration of FIG. 2 compared to the configuration of FIG. 4, the DCS concentration in stream 6 leaving the first TCS-RR 50 is reduced to 7.4% (down from 10%) when the second TCS-RR 70 is added to the process configuration, this brings advantages which are discussed elsewhere.

Considered out of context, these effects due to the addition of TCS-RR 70 are seen as counterproductive because they reduce conversion of TCS to DCS in TCS-RR 50. However, when considered as a combined system, as shown in Table 3, it is seen that the incorporation of the second TCS-RR 70 unexpectedly produces highly beneficial synergistic effects. In fact, when a second TCS-RR 70 is added in the overhead stream leading from the first distillation column 20 to the second distillation column 30, the efficiency of the monosilane system is greatly improved due to significantly higher conversion of TCS to DCS per pass around the TCS recycle loop.

Table 3 shows the changes in the composition of stream 3 exiting the first distillation column 20 with and without the incorporation of the second TCS-RR 70 in the TCS recycle loop, and also shows the changes in the composition of the stream entering the second distillation column 30, which will be stream 3 when no second TCS-RR 70 is included in the configuration, and will be stream 4 when a second TCS-RR 70 is included in the configuration.

TABLE 3

|  | FIG. 4 (WITHOUT TCS-RR 70) | | FIG. 2 (WITH TCS-RR 70) | |
| --- | --- | --- | --- | --- |
|  | Stream 3 Mole % | Stream 3 Mole % | Stream 3 Mole % | Stream 4 Mole % |
| $SiH_4$ | 0.03 | 0.03 | 0.01 | 0.10 |
| MCS | 0.44 | 0.44 | 0.24 | 0.93 |
| DCS | 10.37 | 10.37 | 8.01 | 14.25 |
| TCS | 88.75 | 88.75 | 91.22 | 76.32 |
| STC | 0.40 | 0.40 | 0.52 | 8.40 |

Table 3 illustrates the following points:

The feed to the second distillation column 30 contains 14.25% DCS instead of 10.4% due to the incorporation of the second TCS-RR 70 according to the present disclosure.

The concentration of DCS in the feed to the second distillation column 30 is 37% greater with the configuration of FIG. 2 compared to FIG. 4, which is highly advantageous as is explained elsewhere herein.

The concentration of TCS in feed to the second distillation column 30 is reduced from 89% to 76% and the concentration of STC is increased from 0.4% to 8.4%, which is beneficial as will be explained in the following sections of this disclosure.

The system and process illustrated in FIG. 2 provide significant advantages. For example when the TCS recycle loop contains two TCS-RRs (see, e.g., FIG. 2) compared to only one TCS-RR (see, e.g., FIG. 4):

Capital expenditure required for new monosilane plant installations is reduced due to smaller equipment sizes.

By using two (rather than one) TCS-RRs on the TCS recycle loop, the flow rate of the recycle loop is reduced by 25%. As a direct result:
  a. The heating and cooling duties of the reboiler and condenser systems for the first distillation column 20 are reduced by about 18% to 20% resulting in operational cost savings.
  b. The cross sectional area of the first distillation column 20 and the size of its reboiler and condenser systems are reduced by about 18% to 20%, which reduces capital expenditure required for new monosilane plant installations.
  c. The heating and cooling duties of the reboiler and condenser systems for the second distillation column 30 are reduced by about 23% resulting in operational cost savings.
  d. The cross sectional area of the second distillation column 30 and the size of its reboiler and condenser systems are reduced by about 23%, which reduces capital expenditure required for new monosilane plant installations.
  e. TCS recycle pump sizes and electrical costs to run these pumps are reduced by 25%.
  f. The size of the first TCS-RR 50 may be reduced by 25% when the TCS recycle loop contains two TCS-RRs (see, e.g., FIG. 2) compared to only one TCS-RR (see, e.g., FIG. 4).
  g. The second TCS-RR 70 may be similar in size to the first TCS-RR 50. Over-design in catalyst volume normally added to allow for deactivation from metal chlorides (by locking up the activation sites) is reduced given that the second TCS-RR 70 catalyst bed shares the load that otherwise would be borne entirely by the first TCS-RR 50 catalyst bed. In other words, the over-design need not be added twice.

The total energy required to refine monosilane is reduced by about 18.5%.

The second distillation column (a.k.a. the "DCS" column) profile will reach steady-state after start-up significantly faster due the DCS made in the second TCS-RR 70 which helps establish the column profile. This effect alone increases plant on-stream time by 2 to 4 days per year bringing a commercially important 1% to 2% increase in plant utility.

The condensing temperature of the first distillation column 20 only goes up about 2 degrees due to the reduction of DCS content and does not affect the column condenser or reflux pump design or operations. So the present design can easily be retrofitted to existing monosilane plants, with attendant benefits in energy savings.

In the system and process illustrated in FIG. 2, the following optional embodiments may be included:

The first distillation column 20 reflux temperature of 65° to 75° C. is acceptable as a feed temperature to second TCS-RR 70 and no new reactor feed cooler is needed. A small cooler may optionally be added on the conduit 22 to the system illustrated in FIG. 2 in order to get the temperature down to 55° or 60° C.

Because there is so much STC in the bottom of the second distillation column 30 in the design of FIG. 2, even more energy can be saved by relaxing the target DCS recovery in the column and thus allowing slightly more DCS in stream 5 without significantly hurting over all conversion per pass in the TCS recycle loop when practiced according to the teaching of the present invention.

FIG. 3 illustrates an embodiment of the present disclosure where a second redistribution reactor is present in the DCS recycle loop, i.e., DCS-RR 80, and a second redistribution reactor is not included in the TCS recycle loop. In this embodiment, a redistribution reactor DCS-RR 80 is incorporated onto the third distillation column 40 bottoms product stream 9 between the third distillation column 40 and the second distillation column 30. This embodiment, which is illustrated in FIG. 3 is advantageous compared to the embodiment illustrated in FIG. 4 which has only a single DCS-RR incorporated into the DCS recycle loop, i.e., DCS-RR 60. By including two DCS-RRs on the DCS recycle loop, there are beneficial changes to the compositions of the streams that make up the DCS recycle loop. The effect of these changes are illustrated in Tables 4 and 5.

Table 4 shows the changes in stream 7 leading into the first DCS-RR 60 and the changes in stream 8 leading out of the first DECS-RR 60, when second DCS-RR 80 both is and is not present, as is the case in FIG. 3 (DCS-RR 80 is present) and in FIG. 4 (DCS-RR 80 is not present):

TABLE 4

| | FIG. 4 (WITHOUT DCS-RR 80) | | FIG. 3 (WITH DCS-RR 80) | |
|---|---|---|---|---|
| | Stream 7 Mole % | Stream 8 Mole % | Stream 7 Mole % | Stream 8 Mole % |
| $SiH_4$ | 0.33 | 13.80 | 7.19 | 15.68 |
| MCS | 20.43 | 17.98 | 14.52 | 19.03 |
| DCS | 74.65 | 39.49 | 73.12 | 38.93 |

TABLE 4-continued

| | FIG. 4 (WITHOUT DCS-RR 80) | | FIG. 3 (WITH DCS-RR 80) | |
|---|---|---|---|---|
| | Stream 7 Mole % | Stream 8 Mole % | Stream 7 Mole % | Stream 8 Mole % |
| TCS | 4.58 | 28.38 | 5.16 | 26.06 |
| STC | 0.00 | 0.35 | 0.00 | 0.30 |

Table 4 illustrates the following points:

The incorporation of the second DCS-RR 80 according to the present disclosure hugely increases the concentration of $SiH_4$ in the overhead stream leaving the second distillation column 30, via stream 7, from 0.33% to 7.19%.

With the new reactor DCS-RR 80 in place, the concentration of $SiH_4$ in the feed to the third distillation column 40, i.e., stream 8, is increased from 13.8% to 15.68%.

The concentration of $SiH_4$ in the feed to the third distillation column 40 is about 12% greater with the configuration of FIG. 3 compared to FIG. 4, which is highly advantageous as is explained elsewhere herein.

Table 5 shows the changes in the composition of stream 9 exiting the third distillation column 40 with and without the incorporation of the second DCS-RR 80 in the DCS recycle loop, and also shows the changes in the composition of the stream entering the second distillation column 30, which will be stream 9 when no second DCS-RR 80 is included in the configuration, and will be stream 11 when a second DCS-RR 80 is included in the configuration.

Table 5 shows that with a second DCS-RR 80 in place on the DCS recycle loop, the composition of $SiH_4$ in the feed stream, i.e., stream 11, to the second distillation column 30 feed from the new reactor DCS-RR 80 is hugely higher (i.e., the $SiH_4$ concentration in the feed to the second distillation column 30 is 8.17% up from 0.08%—an increase of 100 times).

TABLE 5

| | FIG. 4 (WITHOUT DCS-RR 80) | | FIG. 3 (WITH DCS-RR 80) | |
|---|---|---|---|---|
| | Stream 9 Mole % | Stream 9 Mole % | Stream 9 Mole % | Stream 11 Mole % |
| $SiH_4$ | 0.08 | 0.08 | 0.09 | 8.17 |
| MCS | 20.84 | 20.84 | 22.55 | 13.94 |
| DCS | 45.77 | 45.77 | 46.12 | 39.44 |
| TCS | 32.90 | 32.90 | 30.88 | 37.77 |
| STC | 0.41 | 0.41 | 0.35 | 0.68 |

The system and process illustrated in FIG. 3 provide significant advantages. For example when the DCS recycle loop contains two DCS-RRs (see, e.g., FIG. 3) compared to only one DCS-RR (see, e.g., FIG. 4):

Capital expenditure required for new monosilane plant installations are reduced due to smaller equipment sizes.

Existing plants can be easily retrofitted.

By using two (rather than one) DCS-RRs on the DCS recycle loop (i.e., the loop defined by the second distillation column 30 overhead product to the first DCS-RR 60 to the third distillation column 40, to the second DCS-RR 80, back to the second distillation column 30), the flow rate of the recycle loop is reduced by about 12%. As a direct result:

h. The heating and cooling duties of the reboiler and condenser systems for the third distillation column 40 are reduced by about 12% resulting in operational cost savings.

i. The cross sectional area of the third distillation column 40 and the size of its reboiler and condenser systems are reduced by about 12%, which reduces capital expenditure required for new monosilane plant installations.

j. The heating and cooling duties of the reboiler and condenser systems for the second distillation column 30 are reduced by about 5% resulting in operational cost savings.

k. The cross sectional area of the second distillation column 30 and the size of its reboiler and condenser systems are reduced by about 5%, which reduces capital expenditure required for new monosilane plant installations.

l. Recycle pump sizes and electrical costs to run these pumps are reduced by about 12%.

m. The size of the first DCS-RR 60 may be reduced by about 12% when the DCS recycle loop contains two DCS-RRs (see, e.g., FIG. 3) compared to only one DCS-RR (see, e.g., FIG. 4).

n. The second DCS-RR 80 may be similar in size to the first DCS-RR 60. Over-design in catalyst volume normally added to allow for deactivation from metal chlorides (by locking up the activation sites) is reduced given that the second DCS-RR 80 catalyst bed shares the load that otherwise would be borne entirely by the first DCS-RR 60 catalyst bed. In other words, the over-design need not be added twice.

The total energy required to refine monosilane is reduced by about 2.2%. These effects and benefits are due to the incorporation of the second DCS-RR 80 according to the present disclosure.

In the system and process illustrated in FIG. 3, the following optional embodiments may be included.

As an optional embodiment, the third distillation column 40 bottom stream 9 may be cooled before being fed into the second DCS-RR 80. The requirement for cooling medium (e.g., cooling water) and adverse effect on second distillation column 30 reboiler duty is minimal because approximately 80% of the cooling load can be recovered with a process to process exchanger.

A variation of this modification is where the feed to the new reactor 80 is pressurized and the product exiting the new reactor 80 is flashed.

The benefits of adding a second TCS-RR 70 and a second DCS-RR 80 are additive. That is to say that adding both TCS-RR 70 and DCS-RR 80 according to FIG. 1, captures the advantages of the additional TCS-RR 70 as shown in FIG. 2 and disclosed herein and captures the advantages of DCS-RR 80 as shown in FIG. 3 and disclosed herein. In the case where both reactors TCS-RR 70 and DCS-RR 80 are added, as illustrated in FIG. 1, any one or more of the following benefits may be achieved:

The TCS conversion to DCS in the large TCS recycle loop is increased by about 35% per pass and the DCS conversion to $SiH_4$ in the second largest DCS recycle loop is increased by about 12% compared to what is achievable in current operational design.

The TCS recycle loop flow rate is reduced by about 25%.

The DCS recycle flow rate is reduced by about 12%.

The total energy required to operate the monosilane refining train is reduced by about 20%, which is greater than the reduction possible if only one of TCS-RR 70 or DCS-RR 80 is added.

The heating and cooling duties of the reboiler and condenser systems for the first distillation column 20 are reduced by about 18% resulting in operational cost savings.

The cross sectional area of the first distillation column 20 and the size of its reboiler and condenser systems are reduced by about 18%, which reduces capital expenditure required for new monosilane plant installations.

The heating and cooling duties of the reboiler and condenser systems for the second distillation column 30 are reduced by about 28% resulting in operational cost savings, which is greater than the reduction possible if only one of TCS-RR 70 or DCS-RR 80 is added.

The cross sectional area of the second distillation column 30 and the size of its reboiler and condenser systems are reduced by about 28%, which reduces capital expenditure required for new monosilane plant installations and which is greater than the reduction possible if only one of TCS-RR 70 or DCS-RR 80 is added.

The heating and cooling duties of the reboiler and condenser systems for the third distillation column 40 are reduced by about 15% resulting in operational cost savings.

The cross sectional area of the third distillation column 40 and the size of its reboiler and condenser systems are reduced by about 15%, which reduces capital expenditure required for new monosilane plant installations.

TCS recycle pump sizes and electrical costs to run these pumps are reduced by about 25%.

DCS recycle pump sizes and electrical costs to run these pumps are reduced by about 15%.

The size of the first TCS-RR 50 may be reduced by about 25% when the TCS recycle loop contains two TCS-RRs (see, e.g., FIG. 2) compared to only one TCS-RR (see, e.g., FIG. 4).

The second TCS-RR 70 may be similar in size to the first TCS-RR 50. Over-design in catalyst volume normally added to allow for deactivation from metal chlorides (by locking up the activation sites) is reduced given that the second TCS-RR 70 catalyst bed shares the load that otherwise would be borne entirely by the first TCS-RR 50 catalyst bed. In other words, the over-design need not be added twice.

The size of the first DCS-RR 60 may be reduced by about 15% when the DCS recycle loop contains two DCS-RRs (see, e.g., FIG. 3) compared to only one DCS-RR (see, e.g., FIG. 4).

The second DCS-RR 80 may be similar in size to the first DCS-RR 60. Over-design in catalyst volume normally added to allow for deactivation from metal chlorides (by locking up the activation sites) is reduced given that the second DCS-RR 80 catalyst bed shares the load that otherwise would be borne entirely by the first DCS-RR 60 catalyst bed. In other words, the over-design need not be added twice.

The second distillation column (a.k.a. the "DCS" column) profile will reach steady-state after start-up significantly faster due the DCS made in the second TCS-RR which helps establish the column profile. This effect alone increases plant on-stream time by 2 to 4 days per year bringing a commercially important 1% to 2% increase in plant utility.

The condensing temperature of the first distillation column 20 only goes up about 2 degrees due to the reduction of DCS content and does not affect the column condenser or reflux pump design or operations. So the present design can easily be retrofitted to existing monosilane plants, with attendant benefits in energy savings.

For example, when both TCS-RR 70 and DCS-RR 80 are added, the flow around the major recycle loop (first distillation column overhead stream 3 to second distillation column 30 bottoms stream 5 to the first TCS-RR and back to the first distillation column 20 via stream 6) is reduced by about 25%. This reduces the energy demand of the first distillation column 20 by about 18%. The flow around the second largest recycle loop (from second distillation column 30 via overhead stream 7 to the first DCS-RR 60 to the third distillation column 40 to the second DCS-RR 80 back to the second distillation column 30 via stream 11) is reduced by about 15%. The flow reduction of the two loops reduces the energy demand of the second distillation column 30 about 28%. The total energy savings on these two columns will exceed 6,800 Kw/Hr or about 20% on a total monosilane plant refining train basis.

These effects are illustrated in Table 6. The first column (TCS-RR 50 and DCS-RR 60 (FIG. 4)) provides the total refining energy consumed per hour in a plant that produces 10,000 metric tons/year of monosilane operating as shown in FIG. 4, and which has a single TCS-RR 50 and a single DCS-RR 60. The second column (TCS-RR 70 added (FIG. 2)) provides the refining energy consumption of a monosilane plant having operating units as shown in FIG. 4, and again operating to produce 10,000 metric tons/year monosilane, but now having a second TCS-RR 70 in addition to the first TCS-RR 50 and first DCS-RR 60. The third column (DCS-RR 80 added (FIG. 3)) provides the refining energy consumption of a monosilane plant having operating units as shown in FIG. 4, and again operating to produce 10,000 metric tons/year monosilane, but now having a second DCS-RR 80 in addition to the first TCS-RR 50 and first DCS-RR 60. The fourth column (TCS-RR 70 and DCS-RR 80 added (FIG. 1)) provides the refining energy consumption of a monosilane plant having operating units as shown in FIG. 4, and again operating to produce 10,000 metric tons/year monosilane, but now having a second TCS-RR 70 and a second DCS-RR 80 in addition to the first TCS-RR 50 and first DCS-RR 60.

TABLE 6

|  | TCS-RR 50 and DCS-RR 60 (FIG. 4) | TCS-RR 70 added (FIG. 2) | DCS-RR 80 added (FIG. 3) | TCS-RR 70 and DCS-RR 80 added (FIG.1) |
|---|---|---|---|---|
| Total Refining Energy* | 34,068 | 27,835 | 33,326 | 27,267 |
| Savings (Kw/Hr) |  | 6,232 | 741 | 6,800 |
| Savings (%) |  | 18.3% | 2.2% | 20.0% |

*Total Refining Energy in terms of Kw/Hr for a plant having at least the operational units shown in FIG. 4, and optionally having an added TCS-RR (70), or an added DCS-RR 80, or both of an added TCS-RR (70) and DCS-RR (80). Total refining energy is that used in all the distillation columns in the monosilane plant.

As mentioned previously, the stream to a reactor, e.g., any one or more of the reactors 50, 60, 70 or 80, may advantageously be cooled, and in one embodiment the present disclosure includes a cooling step whereby feedstock entering any one or more of reactors 50, 60, 70 and 80 is cooled.

Cooling is desirable since an ion exchange resin within a redistribution reactor is not stable at temperatures above about 80° C. or above about 90° C. or above about 100° C. because the solid support of the ion exchange resin may soften and lose its porous structure at elevated temperature. Pre-cooling of the feedstock to the redistribution reactor desirably maintains the temperature within the redistribution reactor below a temperature which is harmful to the catalyst within the redistribution reactor. Accordingly, the present disclosure provides a system wherein a cooling unit, e.g., a refrigeration unit or a heat exchanger, may optionally be positioned between any distillation column and any redistribution reactor, and is optionally positioned only at the entrance to a redistribution reactor, as follows.

A system for silane production comprising:
a. a first distillation column in fluid communication with
   i. a first TCS redistribution reactor, with a cooling unit optionally located between the first distillation column and the first TCS redistribution reactor; and
   ii. a second TCS redistribution reactor, with a cooling unit optionally located between the first distillation column and the second TCS redistribution reactor;
b. a second distillation column in fluid communication with
   i. the first TCS redistribution reactor, with a cooling unit optionally located between the second distillation column and the first TCS redistribution reactor;
   ii. the second TCS redistribution reactor, with a cooling unit optionally located between the second distillation column and the second TCS redistribution reactor;
   iii. a first DCS redistribution reactor, with a cooling unit optionally located between the second distillation column and the first DCS redistribution reactor; and
   iv. a second DCS redistribution reactor, with a cooling unit optionally located between the second distillation column and the second DCS redistribution reactor;
c. and a third distillation column in fluid communication with
   i. the first DCS redistribution reactor, with a cooling unit optionally located between the third distillation column and the first DCS redistribution reactor; and
   ii. the second DCS redistribution reactor, with a cooling unit optionally located between the third distillation column and the second DCS redistribution column.

A system for silane production comprising:
a. a first distillation column in fluid communication with
   i. a first TCS redistribution reactor, with a cooling unit optionally located between the first distillation column and the first TCS redistribution reactor, and
   ii. a second TCS redistribution reactor, with a cooling unit optionally located between the first distillation column and the second TCS redistribution reactor;
b. a second distillation column in fluid communication with
   i. the first TCS redistribution reactor, with a cooling unit optionally located between the second distillation column and the first TCS redistribution reactor;
   ii. the second TCS redistribution reactor, with a cooling unit optionally located between the second distillation column and the second TCS redistribution reactor;
   iii. a third distillation column; and
   iv. a first DCS redistribution reactor, with a cooling unit optionally located between the second distillation column and the first DCS redistribution reactor;

c. and the third distillation column in fluid communication with
   i. the first DCS redistribution reactor, with a cooling unit optionally located between the third distillation column and the first DCS redistribution reactor; and
   ii. the second distillation column.

A system for silane production comprising:
a. a first distillation column in fluid communication with
   i. a first TCS redistribution reactor, with a cooling unit optionally located between the first distillation column and the first TCS redistribution reactor; and
   ii. a second distillation column;
b. the second distillation column in fluid communication with
   i. the first TCS redistribution reactor, with a cooling unit optionally located between the second distillation column and the first TCS redistribution reactor;
   ii. the first distillation column;
   iii. a first DCS redistribution reactor, with a cooling unit optionally located between the second distillation column and the first DCS redistribution reactor; and
   iv. a second DCS redistribution reactor, with a cooling unit optionally located between the second distillation column and the second DCS redistribution reactor;
c. and a third distillation column in fluid communication with
   i. the first DCS redistribution reactor, with a cooling unit optionally located between the third distillation column and the first DCS redistribution reactor; and
   ii. the second DCS redistribution reactor, with a cooling unit optionally located between the third distillation column and the second DCS redistribution reactor.

The present disclosure provides, in separate embodiments, that a single cooling unit is included in the system, where that cooling unit may be located at any of the positions identified in the foregoing embodiments. In other separate embodiments, two cooling units are included in the system, where those two cooling units may be located at any of the positions identified in the foregoing embodiments. In other separate embodiments, three cooling units are included in the system, where those three cooling units may be located at any of the positions identified in the foregoing embodiments. In other separate embodiments, four cooling units are included in the system, where those four cooling units may be located at any of the positions identified in the foregoing embodiments. Preferred locations for cooling units, and cooling steps, are described below, and may be, for example, at the entrance to one or two or three or four of the redistribution reactors.

In general, the desirability of cooling a feed stream depends on the operating column pressure and composition of the chlorosilane in the reactor feed stream. The cooling may be active cooling, e.g., cooling by use of a cooling unit, e.g., circulating cooling fluid, or it may be passive cooling, e.g., cooling by contact with the ambient conditions of the plant. For example, the top pressures of the first and second distillation columns (20 and 30, respectively) may be designed such that the condensing temperature in the top of the columns is hot enough to allow air at summer atmospheric conditions to be used as a condensing medium. This greatly reduces the operating cost of the column when compared to using cooling water or refrigeration as a cooling medium, and the resultant temperature of the stream so cooled is sufficiently cool so that supplemental cooling the reactor feed(s) is not required. In addition, a process design including a lower operating column pressure is also provided as one embodiment of the present disclosure, where this embodiment allows the distillation products to be of sufficiently low temperature such that pre-cooling the reactor feed(s) is not required.

The top pressure in the third distillation column 40 may be designed such that the condensing temperature in the top of the column is high enough to allow the use of simple refrigeration as a condensing medium. While lowering the column pressure would reduce the bottom chlorosilane temperature such that supplemental cooling the reactor feed(s) is not required, it would also reduce the top condensing temperature such that cryogenic refrigeration would be required. This greatly increases the operating cost of the column when compared to using simple refrigeration as a condensing medium. Accordingly, in one embodiment the top pressure in the third distillation column 40 is sufficiently high that simple refrigeration rather than cryogenic refrigeration may be utilized to cool the exit stream 9, and supplemental cooling the reactor 80 feed(s) is provided.

The selection of operating pressure in the first distillation column 20 directly impacts the feed temperature to TCS-RR 70. The selection of operating pressure in the second distillation column 30 directly impacts the feed temperature to TCS-RR 50 and DCS-RR 60. The selection of operating pressure in the third distillation column 40 directly impacts the feed temperature to DCS-RR 80. In an exemplary embodiment, stream 5 exits the second distillation column 30 at an elevated temperature, e.g., a temperature in the range of 100-150° C., or in the range of 125-135° C. and is cooled to a reduced temperature, e.g., a temperature less than 100° C., or less than 80° C., or a temperature of about 65° C., prior to feeding the TCS-RR 50. In another exemplary embodiment, stream 3 exits the first distillation column 20 at a temperature of less than 100° C., or less than 80° C., or in the range of 65-70° C., and no cooling of that stream occurs prior to that stream entering the second TCS-RR 70. In another embodiment, stream 7 exits the second distillation column 30 at an elevated temperature above 50° C., or above 70° C., or in the range of 85-95° C., and is cooled to a temperature of below 50° C., e.g., a temperature in the range of 40-45° C. prior to feeding the first DSC-RR 60. In another embodiment, stream 9 exits the third distillation column 40 at an elevated temperature, e.g., a temperature above 100° C., or about 120° C., or in the range of 130-140° C., and is cooled to a reduced temperature prior to entering the second DCS-RR 80, e.g., to a temperature of less than 80° C., or less than 60° C., or a temperature in the range of 40-45° C. prior to feeding the reactor 80.

In general, there is a likelihood of chlorosilane vaporization in a redistribution reactor as lighter and more volatile chlorosilane species are produced. The kinetics within a redistribution reactor are such that the presence of a vapor phase within the reactor is undesirable, since that can lead to low and inconsistent reaction yields. Accordingly, in one embodiment, the systems and processes of the present disclosure provide that the redistribution reactors are operated at sufficiently high pressure that the formation of a vapor phase within the reactor is inhibited or eliminated. This higher pressure within a reactor can be achieved through either static or dynamic pressure control. Dynamic control makes use of a back pressure regulator or by using a pressure control loop made up of a pressure sensor/transmitter, control valve and closed loop control algorithm. For example, a higher pressure may be achieved by use of a feed pump prior to the reactor and a back pressure controller at the reactor outlet. Static pressure control may be achieved with a pressure valve. In one embodiment, the processes of the present invention provide that the silane and chlorosilane content of a redistribution reactor are entirely in the liquid phase.

In one embodiment, the temperature of the feed stream(s) to DCS-RR 60 and/or DSC-RR 80 is lower than the temperature of the feed stream(s) to TCS-RR 50 and/or TCS-RR 70. In this embodiment, a reduced pressure in DCS-RR 60 and/or DSC-RR 80 may be utilized, than would otherwise be the case, due to the lower temperature(s) utilized to ensure DCS-RR 60 and/or DSC-RR 80 reactor products stay in the liquid phase. When the feed temperature is in the range of about 40-45° C. then the desired pressure is about 350-375 psig. At a higher feed temperature in the range of 60-65° C. the desired pressure is also higher, e.g., about 475-500 psig. Thus a lower reactor operating temperature in the DCS-RR 60 or 80, e.g., 45° C. vs 65° C., can be beneficial, and has a small effect on reaction equilibrium and thus is not a disadvantage.

These embodiments of temperature and pressure control as described above may be utilized in any of the systems and methods of the present disclosure.

In comparison to a reference system illustrated in FIG. 4, the systems and processes of the present disclosure provides many advantages, including:

The major recycle stream in the monosilane production train (the TCS recycle loop) is reduced by 25%;

The second largest recycle stream in the monosilane production train (the DCS recycle loop) is reduced by 15%;

Total energy required to refine monosilane is reduced by about 20%;

The sizes of distillation equipment are significantly reduced;

Capital expenditures for a new plant are reduced; and

Existing plants can be easily retrofitted.

It has been unexpectedly discovered that existing technology may be significantly improved by placing an additional redistribution reactor (second TCS Redistribution Reactor 70) into the process, to react TCS present in the top product of the first distillation column 20 to DCS. This brings several advantages, namely:

1. Increases TCS conversion to DCS in the large TCS recycle loop by about 35% per pass, compared to what is achievable in current operational design.
2. Reduces the mass flow of the large recycle loop by about 25% thus reducing the pumping energy cost.
3. Provides about 18% savings in the energy needed for the first distillation column 20 and about 22% to 23% savings in the energy needed for the second distillation column 30.
4. Reduces the cross sectional area of the first distillation column 20 by about 18% and the cross sectional area of the second distillation column 30 by about 22% to 23%.
5. Reduces the size of the first distillation column 20 reboiler and condenser by about 18% and the size of the second distillation column 30 reboiler and condenser by about 28%.
6. Reduces the size of the first (20) and second (30) distillation column pumps by about 20% to 30%.
7. Reduces the size of the first TCS Redistribution Reactor 50, located on the bottoms stream from the second distillation column 30, and its required catalyst volume by about 25%.

Thus, present invention is a major improvement over existing technology because, for example, it greatly reduces the size of the large TCS recycle stream associated with current operation.

In one embodiment, the present disclosure provides for using two redistribution reactors to convert TCS to DCS instead of just one. In contradistinction, historical designs have focused on maximizing conversion of TCS to DCS in a single reactor which is achieved by feeding a pure TCS feedstock to the first TCS-RR. Historical teaching is that increasing STC content in the feedstock to the first TCS-RR drastically reduces the conversion of TCS to DCS. While the addition of a second TCS-RR, according to the placement taught in the present disclosure, does in fact increase STC present in feed to the first TCS-RR, it has been unexpectedly discovered that overall system conversion is significantly higher with two TCS Redistribution Reactors as part of the TCS recycle loop, operating in series, even though each reactor is not operating at the highest possible individual conversion. Specifically, two redistribution reactors each running with 15% extent of reaction in series will provide a total of 30% conversion which is 1.5 times higher than a single reactor running at 20% conversion. The extent of reaction does drop from 20% to 15% in the first TCS-RR, but this is an expectedly low amount and does not detract from the benefits of the present invention.

As mentioned previously, any of the various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system for silane production comprising:
 a) a first distillation column in fluid communication with
  i) a first TCS redistribution reactor; and
  ii) a second TCS redistribution reactor;
 b) a second distillation column in fluid communication with
  i) the first TCS redistribution reactor;
  ii) the second TCS redistribution reactor;
  iii) a first DCS redistribution reactor; and
  iv) a second DCS redistribution reactor;
 c) and a third distillation column in fluid communication with
  i) the first DCS redistribution reactor; and
  ii) the second DCS redistribution reactor.

2. A system for silane production comprising:
 a) a first distillation column in fluid communication with
  i) a first TCS redistribution reactor and
  ii) a second TCS redistribution reactor;
 b) a second distillation column in fluid communication with
  i) the first TCS redistribution reactor;
  ii) the second TCS redistribution reactor;
  iii) a third distillation column; and
  iv) a first DCS redistribution reactor;
 c) and the third distillation column in fluid communication with
  i) the first DCS redistribution reactor; and
  ii) the second distillation column.

3. A system for silane production comprising:
a) a first distillation column in fluid communication with
  i) a first TCS redistribution reactor; and
  ii) a second distillation column;
b) the second distillation column in fluid communication with
  i) the first TCS redistribution reactor;
  ii) the first distillation column;
  iii) a first DCS redistribution reactor; and
  iv) a second DCS redistribution reactor;
c) and a third distillation column in fluid communication with
  i) the first DCS redistribution reactor; and
  ii) the second DCS redistribution reactor.

4. A system according to claim 1 further comprising a reactor for polysilicon production.

5. A process for silane production comprising:
a) introducing a stream 1 into a first distillation column, where stream 1 comprises DCS, TCS and STC;
b) recovering a stream 2 and a stream 3 from the first distillation column, where stream 2 comprises STC and stream 3 comprises DCS and TCS;
c) introducing the stream 3 into a second TCS redistribution reactor;
d) recovering a stream 4 from the second TCS redistribution reactor, where stream 4 comprises DCS, TCS and STC;
e) introducing the stream 4 and a stream 11 into a second distillation column, where stream 11 comprises silane, MCS, DCS and TCS;
f) recovering a stream 5 and a stream 7 from the second distillation column, where stream 5 comprises TCS and STC and stream 7 comprises silane, MCS and DCS;
g) introducing the stream 7 to a first DCS redistribution reactor;
h) recovering a stream 8 from the first DCS redistribution reactor, where stream 8 comprises silane, MCS, DCS and TCS;
i) introducing the stream 8 into a third distillation column;
j) recovering a stream 9 and a stream 10 from the third distillation column, where stream 9 comprises MCS, DCS and TCS and stream 10 comprises silane;
k) introducing the stream 9 into a second DCS redistribution reactor;
l) recovering the stream 11 from the second DCS redistribution reactor;
m) introducing the stream 5 into a first TCS redistribution reactor;
n) recovering a stream 6 from the first TCS redistribution reactor, where stream 6 comprises DCS, TCS and STC; and
o) introducing stream 6 into the first distillation column.

6. A process for silane production comprising:
a) introducing a stream 1 into a first distillation column, where stream 1 comprises DCS, TCS and STC;
b) recovering a stream 2 and a stream 3 from the first distillation column, where stream 2 comprises STC and stream 3 comprises DCS and TCS;
c) introducing the stream 3 into a second TCS redistribution reactor;
d) recovering a stream 4 from the second TCS redistribution reactor, where stream 4 comprises DCS, TCS and STC;
e) introducing the stream 4 and a stream 9 into a second distillation column, where stream 9 comprises MCS, DCS and TCS;
f) recovering a stream 5 and a stream 7 from the second distillation column, where stream 5 comprises TCS and STC and stream 7 comprises silane, MCS and DCS;
g) introducing the stream 7 to a first DCS redistribution reactor;
h) recovering a stream 8 from the first DCS redistribution reactor, where stream 8 comprises silane, MCS, DCS and TCS;
i) introducing the stream 8 into a third distillation column;
j) recovering a stream 9 and a stream 10 from the third distillation column, where stream 9 comprises MCS, DCS and TCS and stream 10 comprises silane;
k) introducing the stream 9 into the second distillation column;
l) introducing the stream 5 into a first TCS redistribution reactor;
m) recovering a stream 6 from the first TCS redistribution reactor, where stream 6 comprises DCS, TCS and STC; and
n) introducing stream 6 into the first distillation column.

7. A process for silane production comprising:
a) introducing a stream 1 into a first distillation column, where stream 1 comprises DCS, TCS and STC;
b) recovering a stream 2 and a stream 3 from the first distillation column, where stream 2 comprises STC and stream 3 comprises DCS and TCS;
c) introducing the stream 3 and a stream 11 into a second distillation column, where stream 11 comprises silane, MCS, DCS and TCS;
d) recovering a stream 5 and a stream 7 from the second distillation column, where stream 5 comprises TCS and STC and stream 7 comprises silane, MCS and DCS;
e) introducing the stream 7 to a first DCS redistribution reactor;
f) recovering a stream 8 from the first DCS redistribution reactor, where stream 8 comprises silane, MCS, DCS and TCS;
g) introducing the stream 8 into a third distillation column;
h) recovering a stream 9 and a stream 10 from the third distillation column, where stream 9 comprises MCS, DCS and TCS and stream 10 comprises silane;
i) introducing the stream 9 into a second DCS redistribution reactor;
j) recovering the stream 11 from the second DCS redistribution reactor
k) introducing stream 5 into a first TCS redistribution reactor;
l) recovering a stream 6 from the first TCS redistribution reactor, where stream 6 comprises DCS, TCS and STC; and
m) introducing stream 6 into the first distillation column.

8. A process according to claim 5 further comprising producing polysilicon.

9. A system according to claim 2 further comprising a reactor for polysilicon production.

10. A system according to claim 3 further comprising a reactor for polysilicon production.

11. A process according to claim 6 further comprising producing polysilicon.

12. A process according to claim 7 further comprising producing polysilicon.

* * * * *